(12) United States Patent
Linjama

(10) Patent No.: US 8,520,866 B2
(45) Date of Patent: Aug. 27, 2013

(54) APPARATUS, METHOD, AND COMPUTER PROGRAM PRODUCT PROVIDING SOUND-PRODUCED TACTILE FEEDBACK

(75) Inventor: Jukka Linjama, Espoo (FI)

(73) Assignee: Nokia Corporation, Espoo (FI)

( * ) Notice: Subject to any disclaimer, the term of this patent is extended or adjusted under 35 U.S.C. 154(b) by 1676 days.

(21) Appl. No.: 11/639,595

(22) Filed: Dec. 15, 2006

(65) Prior Publication Data

US 2008/0143496 A1 Jun. 19, 2008

(51) Int. Cl.
*H04R 25/00* (2006.01)

(52) U.S. Cl.
USPC ........... 381/151; 381/174; 381/355; 381/351; 381/396

(58) Field of Classification Search
USPC .................................. 381/151, 174
See application file for complete search history.

(56) References Cited

U.S. PATENT DOCUMENTS

| | | | |
|---|---|---|---|
| 3,727,719 A | 4/1973 | Yando | 181/31 B |
| 5,300,857 A | 4/1994 | Imai et al. | 313/491 |
| 5,783,899 A | 7/1998 | Okazaki | 310/317 |
| 5,977,867 A | 11/1999 | Blouin | 340/407.2 |
| 6,211,775 B1* | 4/2001 | Lee et al. | 340/407.1 |
| 6,723,937 B2 | 4/2004 | Englemann et al. | 200/600 |
| 6,809,635 B1 | 10/2004 | Kaaresoja | 340/407.1 |
| 6,885,876 B2 | 4/2005 | Aaltonen et al. | 455/550.1 |
| 7,106,878 B2* | 9/2006 | Saiki et al. | 381/396 |
| 7,512,425 B2* | 3/2009 | Fukuda | 455/575.1 |
| 7,711,131 B2* | 5/2010 | Furuya | 381/182 |
| 2004/0047120 A1* | 3/2004 | Saiki et al. | 361/683 |
| 2004/0252857 A1* | 12/2004 | Lewis | 381/355 |

FOREIGN PATENT DOCUMENTS

| | | |
|---|---|---|
| JP | 2001259134 | 9/2001 |
| JP | 2002028301 | 1/2002 |
| WO | WO 99/48083 A | 9/1999 |

OTHER PUBLICATIONS

Wearden, Graeme; silicon.com; "Mobile & Wireless ... Now Nokia has a 'world first' magic touch"; Nov. 4, 2004; http://networks.silicon.com; CNET Networks.
Immersion; "TouchSense® Integration Kit for Touchscreens"; 2006 Immersion Corporation.

* cited by examiner

*Primary Examiner* — Davetta W Goins
*Assistant Examiner* — Jasmine Pritchard
(74) *Attorney, Agent, or Firm* — Harrington & Smith

(57) ABSTRACT

Apparatus, methods and computer program products are provided to produce tactile feedback from sound. The apparatus is a sound cavity apparatus for a portable communication device and includes: at least one loudspeaker; and at least one cavity. At least one surface of the at least one cavity is configured to vibrate. The sound cavity apparatus is attached to the portable communication device and the sound cavity apparatus is configured to transmit vibration to the portable communication device.

28 Claims, 7 Drawing Sheets

APPARATUS, METHOD, AND COMPUTER PROGRAM PRODUCT PROVIDING SOUND-PRODUCED TACTILE FEEDBACK

TECHNICAL FIELD

The teachings in accordance with the exemplary embodiments of this invention relate generally to user interfaces and, more specifically, relate to tactile feedback (i.e. haptics).

BACKGROUND

With the advent and use of non-mechanical inputs (e.g., virtual keys, touch screens, RFID with magic touch (i.e., near field communication)—see "Now Nokia has a 'world first' magic touch," Silicon.com, Nov. 4, 2004), it is often desirable to provide a form of active feedback for a user. For example, in response to a user touching a "button" or region on a touch screen, a vibration can act as tactile feedback or a sound can act as audible feedback. Vibration is also often used to provide a silent or less audible alert for a user.

One prior art solution is to use a vibrating alert that provides a separate vibration as feedback. However, due to software and hardware variations, it can be difficult to accurately synchronize the timing of the vibration or sound. Furthermore, the vibrating alert should be strong enough that a user can feel or hear it. Even so, fast, sharp feedback pulses with an alert-capable actuator are generally difficult to construct.

Another prior art solution currently seen as promising comprises piezoelectric (PE) actuators. The PE actuators can provide sharp feedback imitating key presses. However, PE actuators are costly (e.g., due to a special driving stage), may not be durable and may have issues with regard to the required mechanical tolerance and durability of components. Furthermore, PE actuators may have a disturbing sound output from the sharp vibration (i.e., the vibration can cause an annoying sound). This last issue can be addressed but requires further optimization of components (e.g., the driving electronics).

Multi-function devices (e.g., a loudspeaker further acting as a vibration-producing unit) can be used to provide both sound and vibration outputs. A disadvantage of such devices lies in the reduced sound quality. In addition, the strong mechanical resonance of the moving magnet can be felt as "rattling" when handling the device (e.g., a non-rigid, "ringing" feel, or a perceived mechanical quality issue). Furthermore, sharp pulses typically cannot be produced (e.g., around 150-200 Hz.).

Some current flat panel speaker systems also provide tactile feedback on the radiating surface. However, these systems often carry specific constraints, such as a requirement for increased durability due to the harsh handling a mobile device may receive.

SUMMARY

In an exemplary aspect of the invention, an apparatus is provided. The apparatus is a sound cavity apparatus for a portable communication device and includes: at least one loudspeaker; and at least one cavity. At least one surface of the at least one cavity is configured to vibrate. The sound cavity apparatus is attached to the portable communication device and the sound cavity apparatus is configured to transmit vibration to the portable communication device.

In another exemplary aspect of the invention, a method is provided. The method includes: providing a movable membrane acoustically coupled to a mass, wherein the movable membrane and the mass define a cavity therebetween; and exciting the movable membrane to produce an audio signal, wherein the produced audio signal enters the cavity and causes the mass to vibrate and produce tactile feedback.

In a further exemplary aspect of the invention, another method is provided. The method includes: enhancing a portion of an electrical signal in a predetermined audio frequency range; and exciting a transducer with the electrical signal having the enhanced portion to produce corresponding tactile feedback in the predetermined audio frequency range.

In another exemplary aspect of the invention, a computer program product is provided. The computer program product includes program instructions embodied on a tangible computer-readable medium. Execution of the program instructions results in operations including: enhancing a portion of an electrical signal in a predetermined audio frequency range; and exciting a transducer with the electrical signal having the enhanced portion to produce corresponding tactile feedback in the predetermined audio frequency range.

In a further exemplary aspect of the invention, another method is provided. The method includes: providing an electrical signal predetermined to comprise a portion with an enhanced amplitude in a predetermined audio frequency range; and exciting a transducer with the electrical signal to produce corresponding tactile feedback in the predetermined audio frequency range.

In another exemplary aspect of the invention, another computer program product is provided. The computer program product includes program instructions embodied on a tangible computer-readable medium. Execution of the program instructions results in operations including: providing an electrical signal predetermined to comprise a portion with an enhanced amplitude in a predetermined audio frequency range; and exciting a transducer with the electrical signal to produce corresponding tactile feedback in the predetermined audio frequency range.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of the invention provide relatively fast tactile events (i.e., vibration) with little or no disturbing or annoying sound accompanying the vibration. Furthermore, the tactile feedback is generated by using a produced acoustic signal.

As noted above, when producing tactile feedback, it is generally desirable to diminish the corresponding audible noise. Some exemplary embodiments of the invention seek to maximize this aspect by utilizing sounds in a predetermined frequency range to excite the vibration. The predetermined frequency range is chosen as a preferable range of frequencies in which vibration can easily be felt by a user but in which a corresponding acoustic signal is not easily heard, at least not at relatively medium or large distances from the device.

Through various experimentation and observation, it has been determined that human touch is generally most sensitive at vibration frequencies in or around a range of 200-300 Hz. Furthermore, sound radiation is generally inefficient from small devices for acoustic signals around or below 500 Hz. (i.e., signals with a quarter wavelength of around 15 cm or more). Such signals are generally not audible in the far field (i.e., at distances greater than 30 cm).

In one exemplary aspect of the invention, a portion of an electrical signal in a predetermined audio frequency range is enhanced. The resulting electrical signal with the enhanced portion is used to excite a transducer and produce an acoustic signal. The excited transducer produces corresponding tactile feedback in the predetermined audio frequency range.

As utilized herein, enhancing an electrical signal is considered to be increasing an aspect or quality of the signal for a given frequency or frequency range, such as by increasing the amplitude of the signal in, at or near the given frequency or frequency range.

As utilized herein, a transducer indicates a component that is capable of converting an electrical signal into an audible signal. One non-limiting example of a transducer is a loudspeaker (i.e., a speaker).

In one non-limiting, exemplary embodiment, the predetermined audio frequency range comprises frequencies about a 200-400 Hz. range.

As one non-limiting, exemplary implementation of the invention, a 300 Hz. range (i.e., frequencies at or around 300 Hz.) is enhanced by digital signal processing (DSP). The enhancement may be performed in consideration of other aspects of the electrical signal, acoustic signal and/or system. As non-limiting examples, the enhancement may be performed in light of the known limits of an amplifier and/or transducer coupled to or in the system, with the enhancement pushing towards the known limits in the 300 Hz. range with dynamic range compression.

Figure 1:
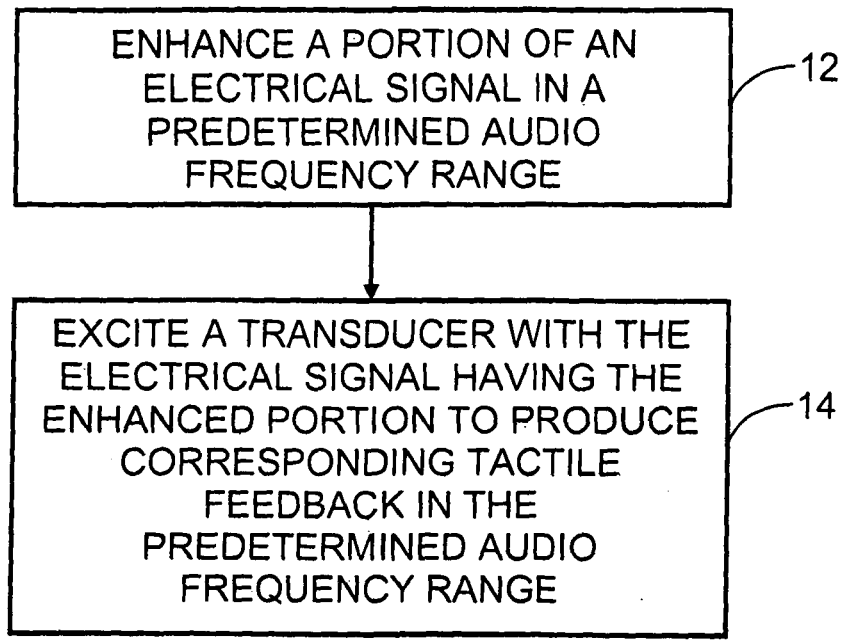
FIG. 1 depicts a flowchart illustrating one non-limiting example of a method for practicing the exemplary embodiments of this invention.

FIG. 1 depicts a flowchart illustrating one non-limiting example of a method for practicing the exemplary embodiments of this invention. The method is to produce tactile feedback from sound and includes the following steps. In box 12, a portion of an electrical signal in a predetermined audio frequency range is enhanced. In box 14, a transducer is excited with the electrical signal having the enhanced portion to produce corresponding tactile feedback in the predetermined audio frequency range.

In another exemplary aspect of the invention, an electrical signal predetermined to comprise a portion with an enhanced amplitude in a predetermined audio frequency range is provided. The electrical signal is utilized to excite a transducer such that the transducer produces corresponding tactile feedback in the predetermined audio frequency range. In such a manner, sound content can be designed that has consistent meaning for the user as both normal, audible sound and as relatively quiet tactile feedback.

Similar to the first exemplary aspect of the invention, in one non-limiting, exemplary embodiment, the predetermined audio frequency range comprises frequencies about a 200-400 Hz. range. In another non-limiting, exemplary embodiment, the predetermined audio frequency range comprises frequencies at or around 300 Hz.

Figure 2:
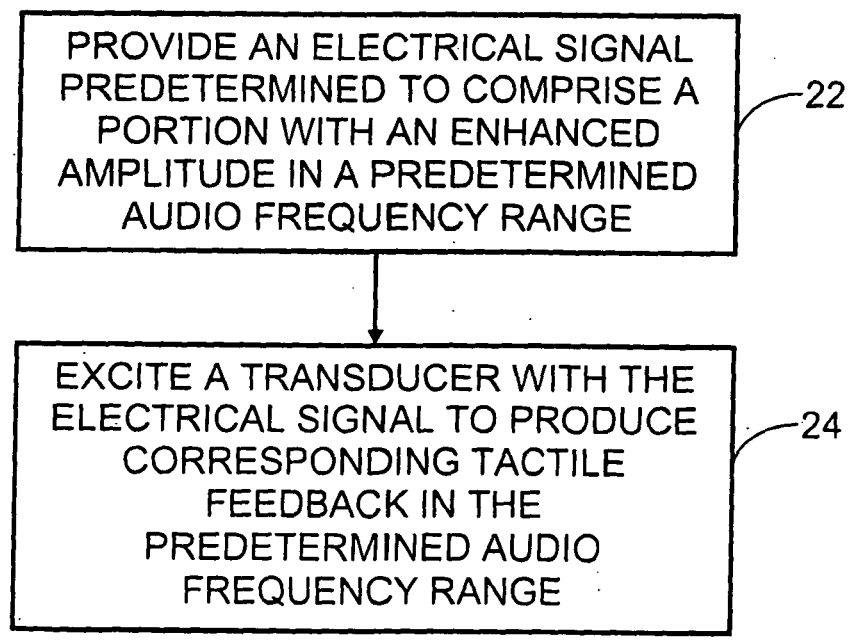
FIG. 2 depicts a flowchart illustrating another non-limiting example of a method for practicing the exemplary embodiments of this invention.

FIG. 2 depicts a flowchart illustrating another non-limiting example of a method for practicing the exemplary embodiments of this invention. The method is to produce tactile feedback from sound and includes the following steps. In box 22, an electrical signal is provided. The electrical signal is predetermined to comprise a portion with an enhanced amplitude in a predetermined audio frequency range. In box 24, a transducer is excited with the electrical signal to produce corresponding tactile feedback in the predetermined audio frequency range.

In other embodiments of the exemplary methods illustrated in FIGS. 1 and 2, a computer program product may be utilized to implement the exemplary methods. The computer program product comprises program instructions embodied on a tangible computer-readable medium, execution of the program instructions resulting in operations comprising the steps of the method. Other embodiments of the computer program product may comprise additional aspects of the further embodiments of the respective method.

The exemplary methods of FIGS. 1 and 2 may be utilized in conjunction with various electronic devices, such as mobile terminals, mobile phones or mobile gaming devices, as non-limiting examples. The exemplary methods of FIGS. 1 and 2 may also be utilized in conjunction with various non-mobile electronic devices.

Figure 3:
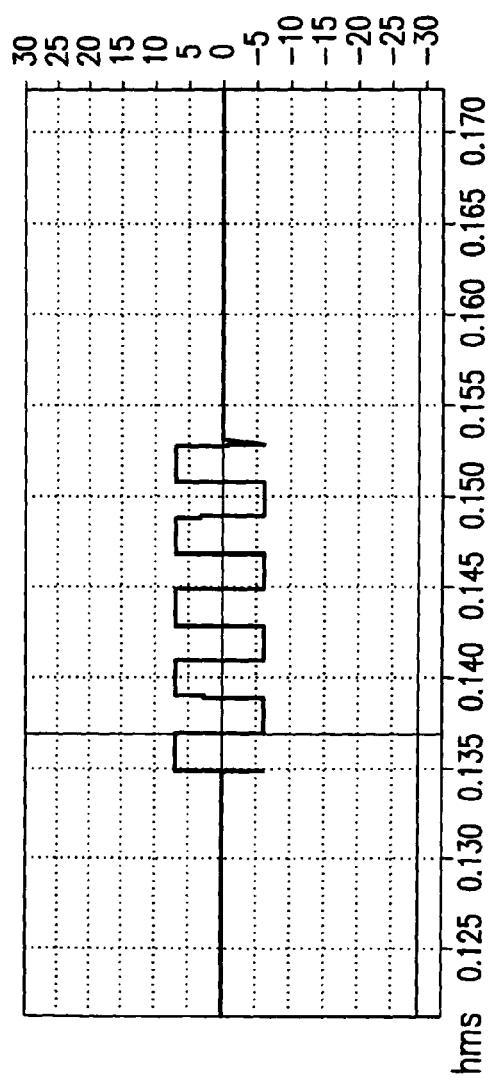
FIGS. 3 and 4 show two example pulses having a frequency of about 250 Hz.
Figure 4:
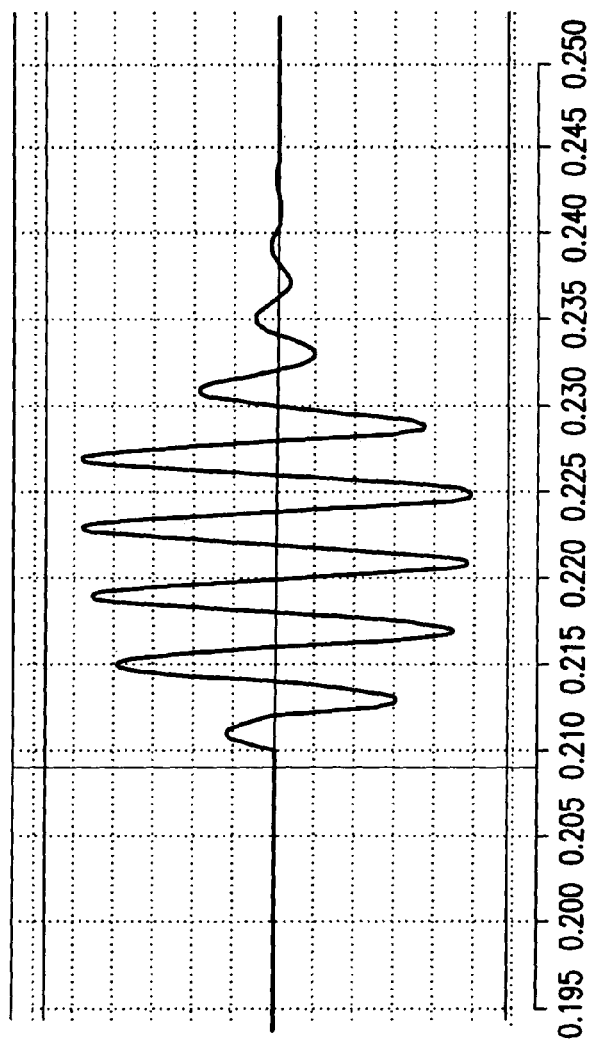
Figure 5:
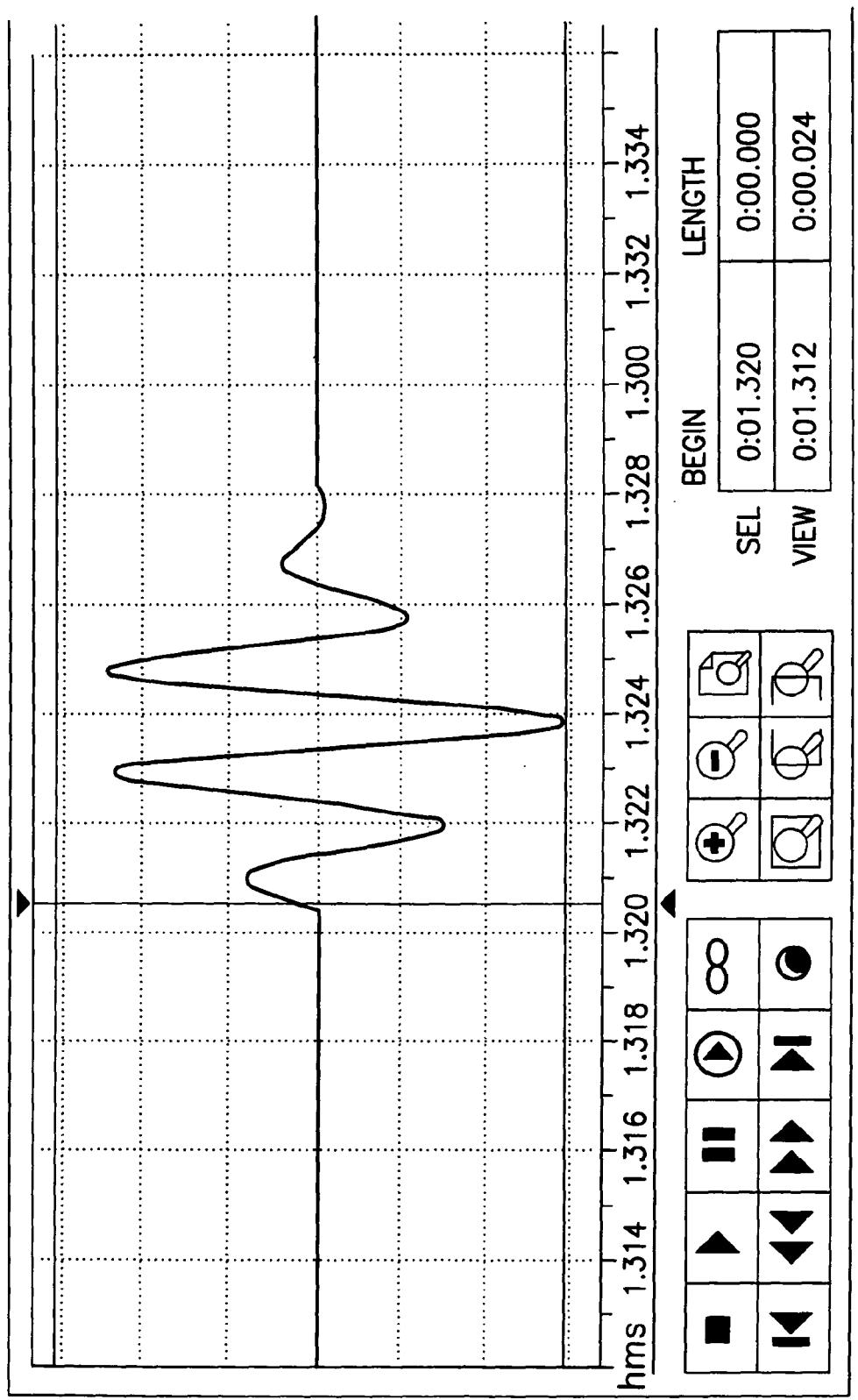
FIG. 5 shows another example pulse having a frequency of about 500 Hz.

FIGS. 3 and 4 show two example pulses or bursts having a frequency of about 250 Hz. The pulses have a duration of 25 ms, which equates to 5 cycles at 250 Hz. FIG. 5 shows another example pulse having a frequency of about 500 Hz. The pulse has a duration of 10 ms, which equates to 4 cycles at 500 Hz. Any of the exemplary pulses shown in FIGS. 3-5 may be employed in conjunction with the exemplary embodiments of the invention. As non-limiting examples, the exemplary pulses may comprise a second signal used to enhance a portion of an acoustic signal in a predetermined frequency range, or the exemplary pulses may comprise a portion of an acoustic signal having an enhanced amplitude in a predetermined frequency range, where the predetermined frequency range comprises the frequency of the respective pulse.

In a further exemplary aspect of the invention, a moveable membrane is excited to produce an acoustic signal. A mass is acoustically coupled to the movable membrane and the movable membrane and the mass define a cavity therebetween. The produced acoustic signal enters the cavity and causes the mass to vibrate and produce tactile feedback. As non-limiting examples, the moveable membrane may comprise a flexible membrane, a ribbon, or any other such suitable component by which excitement and/or oscillation of the component can produce a desired acoustic signal.

Figure 6:
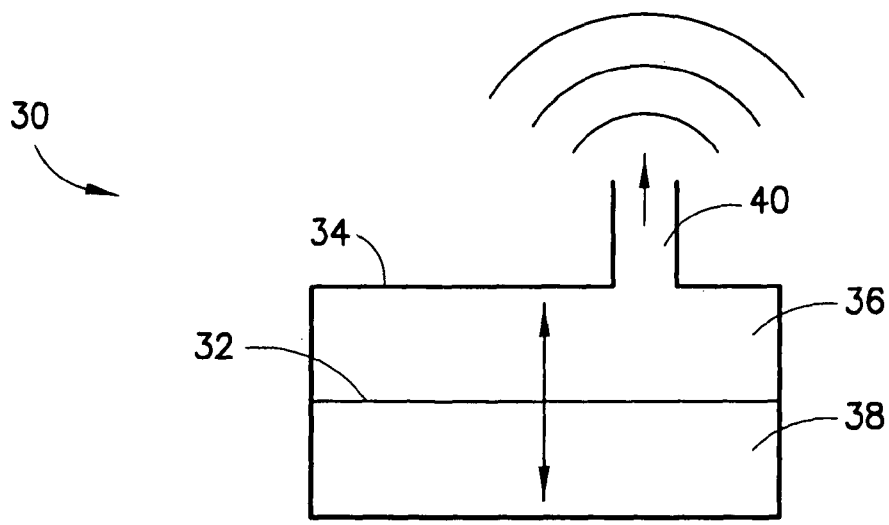
FIG. 6 shows a cross-sectional view of a conventional loudspeaker module.

This aspect of the exemplary embodiments of the invention can better be appreciated when compared to a conventional loudspeaker module. FIG. 6 shows a cross-sectional view of a conventional loudspeaker module 30. The loudspeaker module 30 comprises a flexible membrane 32 coupled to rigid side walls 34. The membrane 32 and the side walls 34 define a front cavity 36 and a back cavity 38. The front cavity 36 is further coupled to a sound hole 40.

Excitement of the membrane 32 (e.g., by an electrical signal) produces an acoustic signal. Since the side walls 34 are rigid, the produced acoustic signal only radiates via the sound hole 40. Although the excitement of the membrane 32 also produces vibration of the side walls 34, this is generally seen as an undesired effect that should be minimized to mitigate distortion of the produced acoustic signal (e.g., by undesired vibration of the sound-producing element—the membrane 32).

In integrated hands-free (IHF) speakers of mobile phones, the excitement of the moveable membrane creates relatively high pressure in the back cavity. As such, the cavity walls are designed to be rigid. In practice, the walls may be slightly flexible, thus leading to some amount of vibration. This aspect of the speakers, in accordance with the exemplary embodiments of the invention, can be improved upon to provide a source of tactile feedback for a user.

Figure 7:
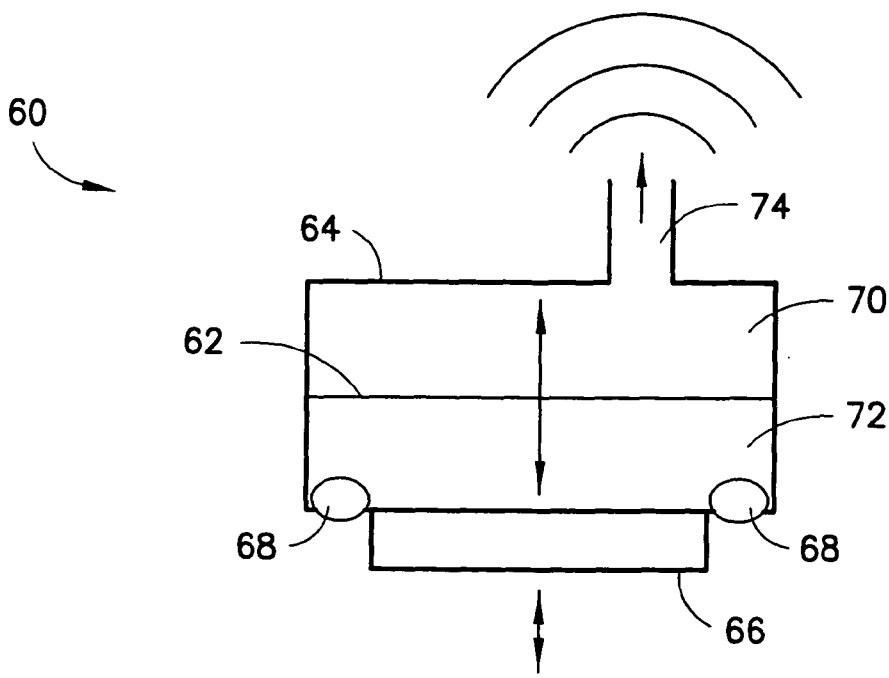
FIG. 7 shows a cross-sectional view of a loudspeaker module incorporating aspects of the exemplary embodiments of the invention.

FIG. 7 shows a cross-sectional view of a loudspeaker module 60 incorporating aspects of the exemplary embodiments of the invention. The loudspeaker module 60 comprises a flexible membrane 62 coupled to side walls 64. The loudspeaker 60 further comprises a vibrating mass 66 moveably coupled by flexible mounts and seals 68 to the side walls 64. The membrane 62 and side walls 64 define a front cavity 70. The membrane 62, side walls 64 and mass 66 define a back cavity 72. The front cavity 70 is further coupled to a sound hole 74.

Excitement of the membrane 62 (e.g., by an electrical signal) produces an acoustic signal. Since the side walls 64 are rigid, the produced acoustic signal radiates via the sound hole 74. The excitement of the membrane 62 also produces vibration that is translated to the mass 66 coupled to the back cavity 72. The mass 66 vibrates, thus producing tactile feedback for a user. As is apparent, the membrane 62 is acoustically coupled to the mass 66.

In other embodiments, the vibration of the mass 66 may be tuned to resonate at a frequency in a range of about 200-400 Hz. Tuning of the frequency may be arranged by appropriate selection of the mass 66 and seal 68 (e.g., selecting a seal or seal material having a desired flexibility). In further embodiments, the vibration of the mass 66 may be tuned to resonate at frequencies at and/or around 300 Hz.

In some exemplary embodiments of the invention, the inertial, internal vibration of the loudspeaker module 60 comprises the tactile feedback. (See e.g., FIG. 8, and as further discussed below.) In other exemplary embodiments, the vibrating device may be designed to further capitalize on the produced tactile feedback. As a non-limiting example, the mass 66 may be coupled to an outer casing (e.g., the outside) of the device. As another non-limiting example, the mass 66 may comprise all or a portion of an outer casing or component of the device. (See, e.g., FIG. 9, and as further discussed below.)

In further exemplary embodiments of the invention, the loudspeaker module may not comprise a sound hole 74. In such embodiments, the acoustic signal produced may not propagate or may not propagate well (e.g., substantially, loudly, at great distances) from the loudspeaker module and/or device within which the loudspeaker module is housed.

In contrast to conventional speaker systems and designs, other exemplary embodiments of the invention may seek to minimize the acoustic signal output (i.e., the radiated sound) while simultaneously seeking to maximize the tactile feedback (i.e., the vibration translated to a user).

By utilizing the exemplary design of FIG. 7, or other similar designs in accordance with the exemplary aspects of the invention, the system can benefit from using the same or similar hardware and/or software for both acoustic signals (i.e., sound, audio content) and tactile effects. Another benefit from the exemplary designs discussed is that there are little or no delay or synchronization issues between the audio output and the tactile output. Thus, the exemplary embodiments of the invention may be utilized in situations where fast tactile feedback is desirable (e.g., touch screens). Furthermore, the produced acoustic signal may be rendered such that is not loud and does not radiate to the far field (i.e., it cannot be heard at distances from the device).

Figure 8:
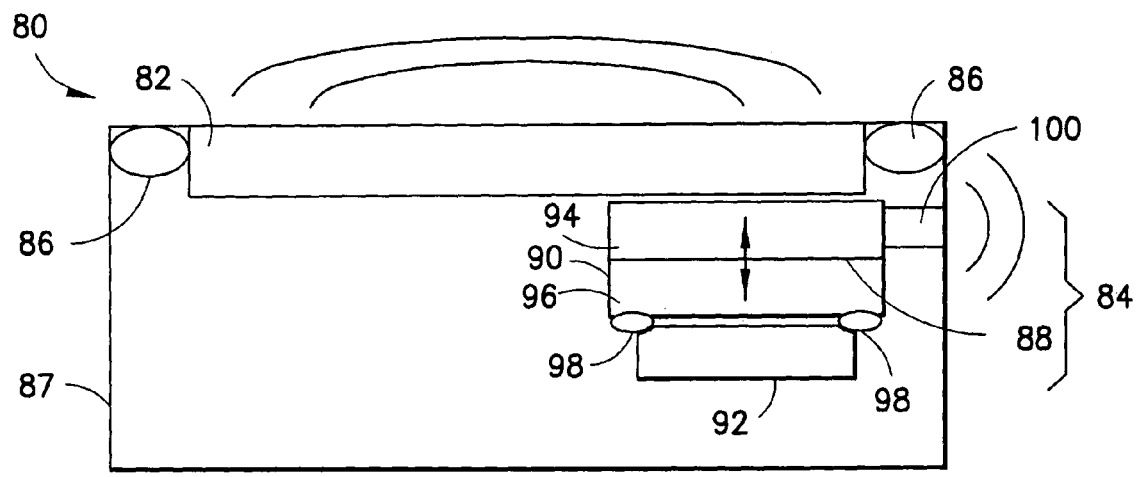
FIG. 8 shows a cross-sectional view of an electronic device with a touch pad and a loudspeaker module incorporating aspects of the exemplary embodiments of the invention.

FIG. 8 shows a cross-sectional view of an electronic device 80 with a touch pad 82 and a loudspeaker module 84 incorporating aspects of the exemplary embodiments of the invention. The touch pad 82 is moveably coupled by flexible mountings and seals 86 to the electronic device 80 such that the touch pad 82 is enabled to vibrate (i.e., provide tactile feedback) independently from an exterior housing 87 of the electronic device 80. The loudspeaker module 84 is coupled to the touch pad 82. The loudspeaker module 84 comprises a flexible membrane 88, side walls 90 and a mass 92. The flexible membrane 88 and side walls 90 define a front cavity 94 and a back cavity 96. The mass 92 is moveably coupled via flexible mountings and seals 98 to the back cavity 96. The front cavity 94 is coupled to a sound hole 100.

The flexible membrane 88 is excited (e.g., by an electrical signal), thus producing an acoustic signal. The acoustic signal can radiate via the sound hole 100. The acoustic signal causes the suspended mass 92 to vibrate (i.e., provide tactile feedback). The vibration of the mass 92 translates via the loudspeaker module 84 (e.g., via the side walls 90) to the touch pad 82. As is apparent, the membrane 88 is acoustically coupled to the mass 92. In such a manner, and as a non-limiting example, in response to a user interacting with the touch pad 82, the user can receive tactile feedback due to the vibration of the mass 92 as caused by an acoustic signal produced by the flexible membrane 88. In another non-limiting example, and also in accordance with the exemplary embodiments of the invention, a user may also receive tactile feedback in response to an event, such as an incoming phone call, text message, alarm or voicemail reminder, as non-limiting examples.

Figure 9:
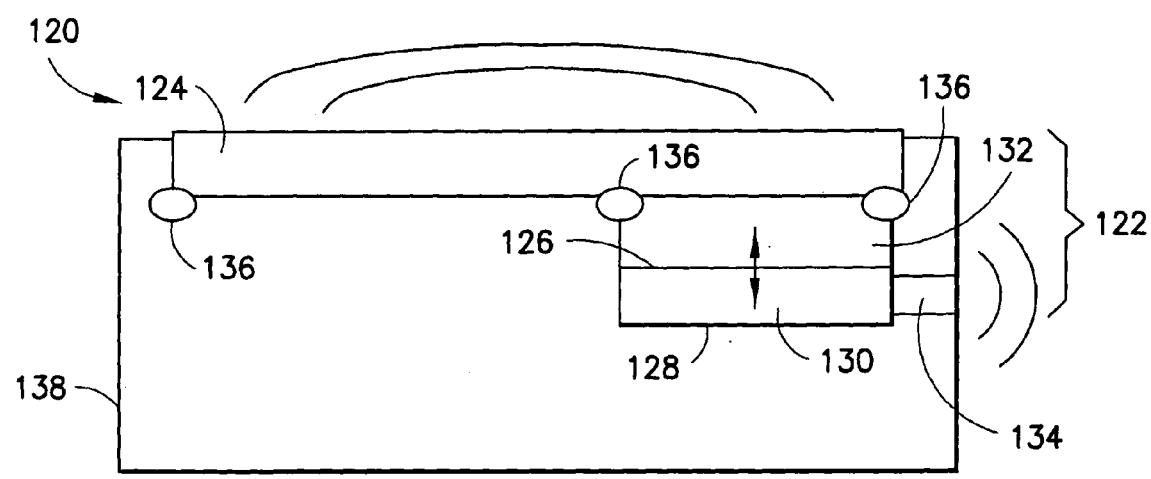
FIG. 9 shows a cross-sectional view of another electronic device with a touch pad and a loudspeaker module incorporating aspects of the exemplary embodiments of the invention.

FIG. 9 shows a cross-sectional view of another electronic device 120 with a loudspeaker module 122 incorporating aspects of the exemplary embodiments of the invention. In the electronic device 120 of FIG. 9, the loudspeaker module 122 comprises a touch pad 124 such that the touch pad 124 itself acts as the mass of the loudspeaker module 122. The loudspeaker module 122 further comprises a flexible membrane 126 and side walls 128. The flexible membrane 126 and side walls 128 define a front cavity 130 and a back cavity 132. The front cavity 130 is coupled to a sound hole 134. The touch pad 124 is coupled to the side walls 128 and the electronic device 120 by flexible mountings and seals 136 such that the touch pad 124 is enabled to vibrate (i.e., provide tactile feedback) independently from an exterior housing 138 of the electronic device 120.

The flexible membrane 126 is excited (e.g., by an electrical signal), thus producing an acoustic signal. The acoustic signal can radiate via the sound hole 134. The acoustic signal causes the touch screen 124 to vibrate (i.e., provide tactile feedback). As is apparent, the membrane 126 is acoustically coupled to the touch screen 124. Thus, as a non-limiting example, in response to a user interacting with the touch pad 124, the user can receive tactile feedback due to the vibration of the touch screen 124 as caused by an acoustic signal produced by the flexible membrane 126. In another non-limiting example, and also in accordance with the exemplary embodiments of the invention, a user may also receive tactile feedback in response to an event, such as an incoming phone call, text message, alarm or voicemail reminder, as non-limiting examples.

Although shown above in FIGS. 7-9 with a flexible membrane, the loudspeaker module may comprise any suitable moveable membrane as described above. Furthermore, although shown in FIGS. 8-9 with a touch pad, the device may comprise any suitable user interface component including, as non-limiting examples, a touch screen, virtual keys and/or RFID with magic touch.

Figure 10:
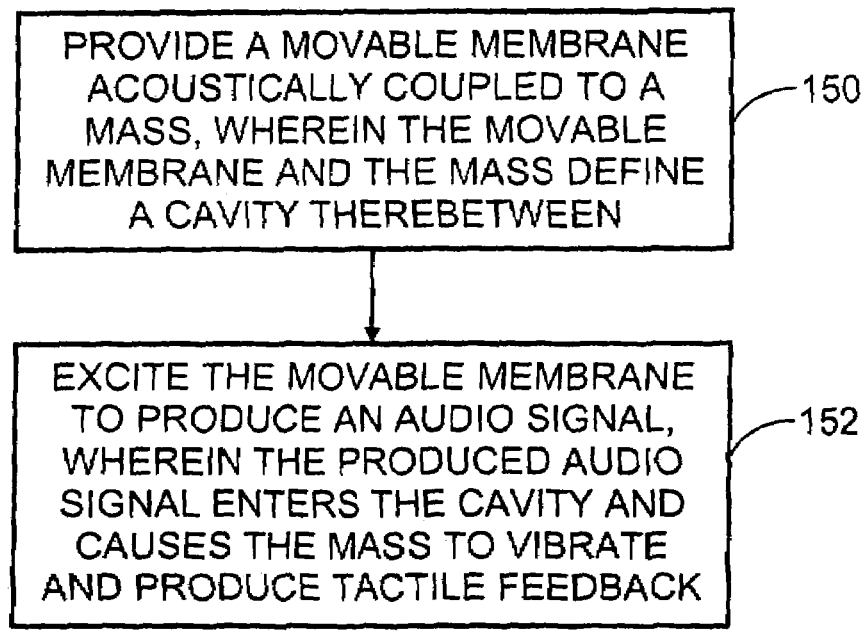
FIG. 10 depicts a flowchart illustrating another non-limiting example of a method for practicing the exemplary embodiments of this invention.

FIG. 10 depicts a flowchart illustrating another non-limiting example of a method for practicing the exemplary embodiments of this invention. The method is to produce tactile feedback from sound and includes the following steps. In box 150, a movable membrane acoustically coupled to a mass is provided. The movable membrane and the mass define a cavity therebetween. In box 152, the movable membrane is excited to produce an acoustic signal. The produced acoustic signal enters the cavity and causes the mass to vibrate and produce tactile feedback.

Figure 11:
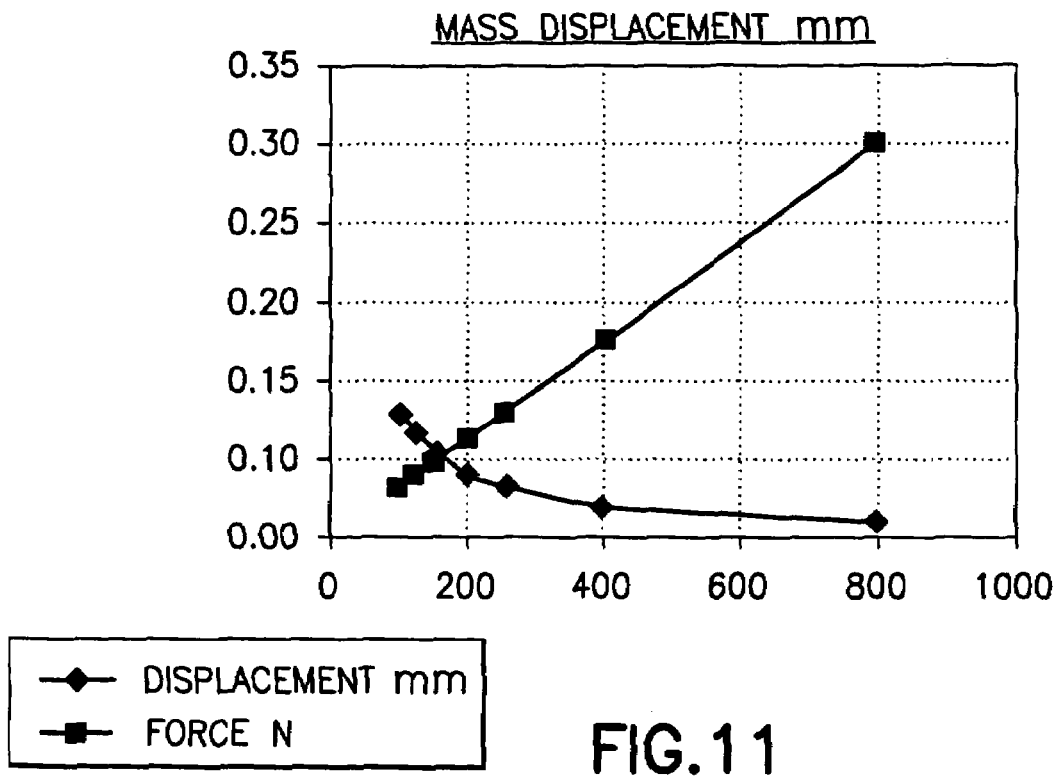
FIGS. 11 and 12 depict graphs of the moving mass displacement (mm) and force (N) as a function of frequency (Hz.) for Tables 1 and 2, respectively.
Figure 12:
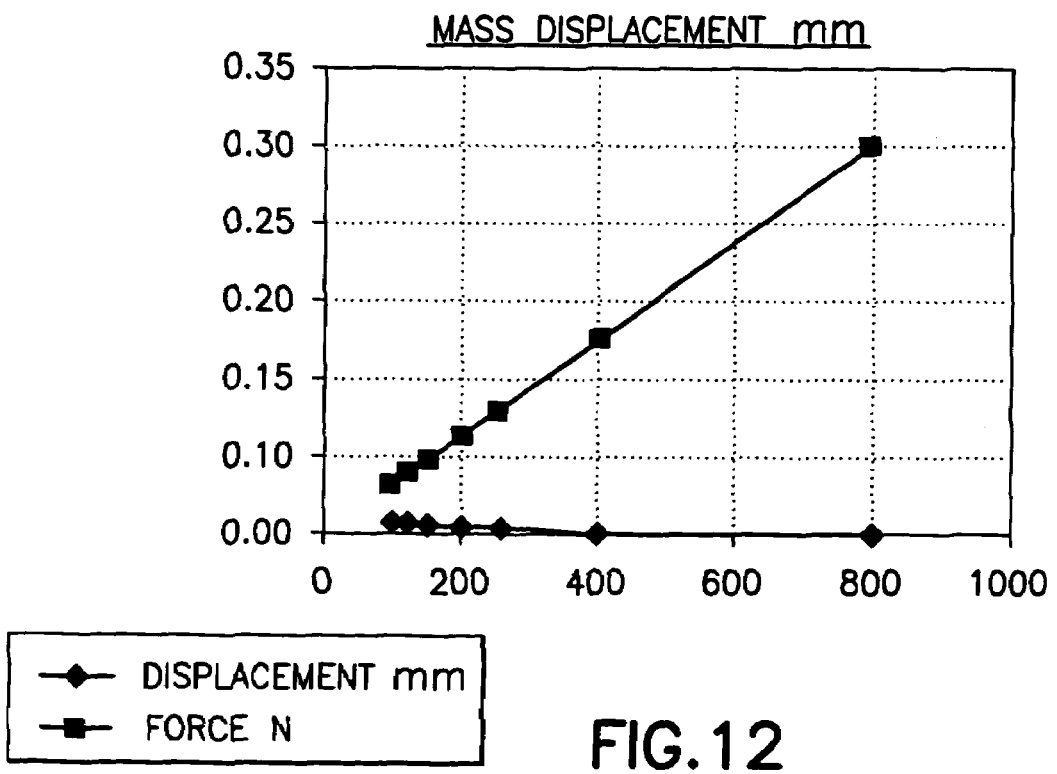

FIGS. 11 and 12 depict graphs of the moving mass displacement (mm) and force (N) as a function of frequency (Hz.) for Tables 1 and 2, respectively. Tables 1 and 2 show data for two models of exemplary systems incorporating aspects of the exemplary embodiments of the invention.

For a first model, shown in Table 1 and graphed in FIG. 11, it is assumed that the touch pad feedback requirement is 5 mm/s at the surface. This model corresponds to an arrangement as shown in FIG. 8. Note that references to "phone" in this model correspond to the touch pad. For example, a target phone velocity corresponds to a target touch pad velocity. Furthermore, it is assumed that there are two separate systems: the moving mass (i.e., the touch pad) and the phone. The touch pad area comprises the inertial mass with 1 g of dynamic mass acting as moving mass excitation. The flexibility of the inertial mass is assumed to have a displacement of 1.6 mm with a force of 10 N and 0.13 mm with nominal excitation.

TABLE 1

First Model
moving mass (g) = 1
phone mass (g) = 10
target phone velocity (mm/s) = 5
mass ratio = 10

| freq Hz | omega (angular freq) 1/s | Phone displacement Um | phone acceleration m/s2 | mass displacement mm | force N | approx. k = F/d moving mass stiffness N/mm | k from omega and mass k = mw^2 N/mm | finger press: static displacement with 10 N d = F/k Mm |
|---|---|---|---|---|---|---|---|---|
| 50 | 314 | 15.92 | 1.57 | 0.16 | 0.02 | 0.10 | 0.098696 | 101.3212 |
| 70 | 440 | 11.37 | 2.20 | 0.11 | 0.02 | 0.19 | 0.193444 | 51.69448 |
| 100 | 628 | 7.96 | 3.14 | 0.08 | 0.03 | 0.39 | 0.394784 | 25.3303 |
| 120 | 754 | 6.63 | 3.77 | 0.07 | 0.04 | 0.57 | 0.568489 | 17.59048 |
| 150 | 942 | 5.31 | 4.71 | 0.05 | 0.05 | 0.89 | 0.888264 | 11.25791 |
| 200 | 1257 | 3.98 | 6.28 | 0.04 | 0.06 | 1.58 | 1.579137 | 6.332574 |
| 250 | 1571 | 3.18 | 7.85 | 0.03 | 0.08 | 2.47 | 2.467401 | 4.052847 |
| 400 | 2513 | 1.99 | 12.57 | 0.02 | 0.13 | 6.32 | 6.316547 | 1.583143 |
| 800 | 5027 | 0.99 | 25.13 | 0.01 | 0.25 | 25.27 | 25.26619 | 0.395786 |

A second model, as shown in Table 2 and graphed in FIG. 12, relies on the same assumptions of the first model only in this case the moving mass is the touch screen, and the phone device mass is 100 g. This model corresponds to the system shown in FIG. 9 where the moving mass is the touch screen. Otherwise, the only other differences comprise the target phone velocity and mass values used in the second model.

TABLE 2

Second Model
moving mass (g) = 10
phone mass (g) = 100
target phone velocity (mm/s) = 0.5
mass ratio = 10

| freq Hz | omega (angular freq) 1/s | Phone displacement Um | phone acceleration m/s2 | mass displacement mm | force N | approx. k = F/d moving mass stiffness N/mm | k from omega and mass k = mw^2 N/mm | finger press: static displacement with 10 N d = F/k Mm |
|---|---|---|---|---|---|---|---|---|
| 50 | 314 | 1.59 | 0.16 | 0.02 | 0.02 | 0.99 | 0.98696 | 10.13212 |
| 70 | 440 | 1.14 | 0.22 | 0.01 | 0.02 | 1.93 | 1.934442 | 5.169448 |
| 100 | 628 | 0.80 | 0.31 | 0.01 | 0.03 | 3.95 | 3.947842 | 2.53303 |
| 120 | 754 | 0.66 | 0.38 | 0.01 | 0.04 | 5.68 | 5.684892 | 1.759048 |
| 150 | 942 | 0.53 | 0.47 | 0.01 | 0.05 | 8.88 | 8.882644 | 1.125791 |
| 200 | 1257 | 0.40 | 0.63 | 0.00 | 0.06 | 15.79 | 15.79137 | 0.633257 |
| 250 | 1571 | 0.32 | 0.79 | 0.00 | 0.08 | 24.67 | 24.67401 | 0.405285 |
| 400 | 2513 | 0.20 | 1.26 | 0.00 | 0.13 | 63.17 | 63.16547 | 0.158314 |
| 800 | 5027 | 0.10 | 2.51 | 0.00 | 0.25 | 252.66 | 252.6619 | 0.039579 |

The exemplary embodiments of the invention may be implemented in conjunction with suitable materials and components as are known to one of ordinary skill in the art.

As used herein, the couplings of a system incorporating aspects of the exemplary embodiments of the invention comprise acoustical couplings such that vibrations of the acoustical signal produced by the movable membrane (i.e., the sound-producing element) are transmitted through air to the vibrating surface, causing the surface to vibrate.

As discussed above, one exemplary embodiment of the invention comprises a vibration device comprising a moveable membrane and a mass acoustically coupled to the moveable membrane. Excitement of the movable membrane produces an acoustic signal. The movable membrane and the mass define a cavity therebetween. The produced acoustic signal enters the cavity and causes the mass to vibrate and produce tactile feedback.

The vibration device may comprise a component in an electronic device. In general, various embodiments of such an electronic device can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In other embodiments, such an electronic device may comprise a fixed or generally non-mobile device, such as a desktop computer or a computer monitor, as non-limiting examples.

As non-limiting examples, the vibration device may comprise a touch screen, a touch pad or an RFID with magic touch (i.e., near field communication).

In other embodiments, the vibration device may further comprise a data processor and a memory coupled to the data processor, wherein the data processor is configured to excite the moveable membrane to produce an acoustic signal. Such a memory may be of any type suitable to the local technical environment and may be implemented using any suitable data storage technology, such as semiconductor-based memory devices, magnetic memory devices and systems, optical memory devices and systems, fixed memory and removable memory, as non-limiting examples. Such a data processor may be of any type suitable to the local technical environment, and may include one or more of general purpose computers, special purpose computers, microprocessors, digital signal processors (DSPs) and processors based on a multi-core processor architecture, as non-limiting examples.

In other embodiments, the vibration device may comprise a loudspeaker comprising the movable membrane. In further embodiments, the vibration device is configured such that the produced acoustic signal does not radiate or radiates minimally from the vibration device. In other embodiments, the vibration device comprises at least one cavity wall, wherein the cavity is further defined by the at least one cavity wall. In further embodiments, the at least one cavity wall comprises an aperture configured to radiate the produced acoustic signal. In other embodiments, the aperture comprises one of a duct, tube or canal. In further embodiments, the cavity comprises an only cavity of the vibration device and the acoustic signal is radiated by an exterior face of the vibration device located adjacent to the cavity. In other embodiments, the mass comprises one of a touch screen, a touch pad and a keypad. In further embodiments, the vibration device comprises at least one of a touch screen, a touch pad and a keypad, wherein the at least one of a touch screen, a touch pad and a keypad is coupled to the mass. In other embodiments, the tactile feedback is produced in response to a user interacting with the at least one of a touch screen, a touch pad and a keypad. In further embodiments, the tactile feedback is produced in response to a user interacting with the mass.

In other embodiments, the vibration device comprises a vibration component of a mobile communication device. In further embodiments, wherein the vibration device is coupled to the mobile communication device by at least one of: glue, ultrasonic welding, screws and snap connectors. In other embodiments, the mobile communication device comprises a mobile phone. In further embodiments, a perception of the acoustic signal as heard by a person is minimized and a perception of the vibration as felt by a person is maximized. In other embodiments, the caused vibration is tuned to resonate at a frequency in about a 200-400 Hz. range.

Another exemplary embodiment of the invention comprises a an apparatus is provided. The apparatus is a sound cavity apparatus for a portable communication device and comprises: at least one loudspeaker; and at least one cavity, wherein at least one surface of the at least one cavity is configured to vibrate, wherein the sound cavity apparatus is attached to the portable communication device, wherein the sound cavity apparatus is configured to transmit vibration to the portable communication device.

Note that the at least one surface does not touch the membrane of the loudspeaker. The main coupling is acoustical since the vibrations are transmitted through the air between the at least one surface and the membrane.

In other embodiments, the at least one cavity is located in a front of the at least one loudspeaker. In further embodiments, the at least one cavity is located in a back of the at least one loudspeaker. In other embodiments, the at least one surface is made of a same material as other surfaces of the at least one cavity, wherein the at least one surface comprises a thinner thickness than other surfaces of the at least one cavity such that the at least one surface offers less resistance to moving forces and is thus capable of vibrating. In further embodiments, the at least one surface comprises at least one of a moving mass and a piston, wherein the at least one of a moving mass and a piston is attached to the rest of the cavity by a flexible mounting material. In other embodiments, the at least one of a moving mass and a piston is made of a different material than other surfaces of the at least one cavity, wherein the at least one of a moving mass and a piston has a different thickness than other surfaces of the at least one cavity.

In other embodiments, the at least one cavity has at least one opening allowing sound radiation to pass. In further embodiments, the apparatus further comprises one of a duct, tube or canal that follows the opening. In other embodiments, the at least one cavity comprises the only cavity of the sound cavity apparatus, wherein sound is radiated by a side of the loudspeaker that has no cavity. In further embodiments, the sound cavity apparatus is installed or attached completely inside the portable communication device. In other embodiments, the sound cavity apparatus is attached to the portable communication device at an attachment area, wherein the attachment area involves any part of the portable communication device and at least one surface of the sound cavity apparatus. In further embodiments, the attachment comprises at least one of glue, ultrasonic welding, screws and snaps.

In other embodiments, the at least one surface is not attached to any part of the portable communication device. In further embodiments, the at least one surface comprises a keypad that vibrates when it is touched, wherein the at least one surface gives tactile feedback. In other embodiments, the apparatus further comprises flexible mounts and seals. In further embodiments, the at least one surface is attached to a part of the portable communication device. In other embodiments, wherein the at least one surface is attached to a standard keypad to transmit vibration. In further embodiments, the at least one surface is attached to a touch display. In other embodiments, the touch display can act as a display keypad. In further embodiments, the at least one surface is attached to a part of the portable communication device to transmit vibration for any specified event in the portable communication device. In other embodiments, the any specified event is controlled by processes implemented by at least one of hardware and software.

In other embodiments, the sound cavity apparatus is designed such that vibration can be transmitted at the same time sound is reproduced. In further embodiments, of sound and vibration only vibration is perceived. In other embodiments, of sound and vibration only sound is perceived. In further embodiments, audio tuning is used. In other embodiments, the audio tuning comprises spectral equalization. In further embodiments, the portable communication device comprises at least one of a mobile phone, a music player, a portable computer and other portable devices having an audio system and a user interface enabled to receive a user input. In further embodiments, a certain type of signal is used to produce vibration. In other embodiments, music produces vibration. In further embodiments, ring tones produce vibrations. In other embodiments, the at least one surface comprises one of a touch screen, a touch pad, a keypad, at least one volume key, other keys or any part of a chassis of the portable communication device. In further embodiments, tactile feedback is produced in response to a user interacting with the at least one surface. In other embodiments, a caused vibration is tuned to resonate at a frequency in about a 200-400 Hz. range.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus for a portable communication device, comprising:
   a processor configured to enhance a portion of an electrical signal in a predetermined audio frequency range;
   at least one cavity; and
   at least one loudspeaker configured to receive the enhanced electrical signal and to radiate an acoustic signal from the portable communication device via at least one sound hole made in a wall of the at least one cavity, wherein the radiated acoustic signal includes a portion based on the electrical signal enhanced in the predetermined audio frequency range, wherein the at least one cavity is acoustically coupled to the at least one loudspeaker, wherein at least one surface of the at least one cavity is configured to vibrate the portable communication device when the acoustic signal enters the at least one cavity, wherein the vibration is transmitted to the portable communication device at the same time the acoustic signal is radiated from the at least one sound hole directly to a region exterior to the portable communication device, wherein the at least one cavity is acoustically coupled to the region exterior to the portable communication device via the at least one sound hole.

2. The apparatus of claim 1, wherein the at least one cavity is located in a front of the at least one loudspeaker.

3. The apparatus of claim 1, wherein the at least one cavity is located in a back of the at least one loudspeaker.

4. The apparatus of claim 1, wherein the at least one surface is made of a same material as other surfaces of the at least one cavity, wherein the at least one surface comprises a thinner thickness than other surfaces of the at least one cavity such that the at least one surface offers less resistance to moving forces and is thus capable of vibrating.

5. The apparatus of claim 1, wherein the at least one surface comprises at least one of a moving mass and a piston, wherein the at least one of a moving mass and a piston is attached to the rest of the cavity by a flexible mounting material.

6. The apparatus of claim 1, wherein the at least one sound hole comprises one of a duct, tube or canal.

7. The apparatus of claim 1, wherein the apparatus is attached to the portable communication device at an attachment area, wherein the attachment area involves any part of the portable communication device and at least one surface of the sound cavity apparatus.

8. The apparatus of claim 7, wherein the attachment comprises at least one of glue, ultrasonic welding, screws and snaps.

9. The apparatus of claim 1, wherein the at least one surface of the at least one cavity is configured to vibrate, wherein the at least one surface comprises a keypad that vibrates when it is touched, wherein the at least one surface gives tactile feedback.

10. The apparatus of claim 1, wherein the at least one surface is attached to a keypad to transmit the vibration.

11. The apparatus of claim 1, wherein the at least one surface is attached to a touch display.

12. The apparatus of claim 1, wherein audio spectral equalization is used.

13. The apparatus of claim 1, wherein the portable communication device comprises at least one of a mobile phone, a music player, a portable computer and other portable devices having an audio system and a user interface enabled to receive a user input.

14. The apparatus of claim 1, wherein the at least one surface comprises one of a touch screen, a touch pad, a keypad, at least one volume key, other keys or any part of a chassis of the portable communication device.

15. The apparatus of claim 14, wherein tactile feedback is produced in response to a user interacting with the at least one surface.

16. The apparatus of claim 1, wherein the acoustic signal is tuned to generate vibration of the at least one surface at a frequency in about a 200-400 Hz. range.

17. A method to produce tactile feedback from sound, comprising:

providing a movable membrane acoustically coupled to a mass, wherein the movable membrane and the mass define a cavity therebetween, wherein the cavity is coupled to at least one sound hole, wherein the movable membrane and the mass are embodied in a portable communication device; and exciting the movable membrane to a predetermined audio frequency range to produce an audio signal, wherein the produced audio signal enters the cavity and causes the mass to vibrate in the predetermined audio frequency range and produce tactile feedback at the same time the audio signal is radiated from the at least one sound hole directly to a region exterior to the portable communication device, wherein the radiated audio signal includes a portion with an enhanced amplitude in the predetermined audio frequency range.

18. The method of claim 17, wherein the predetermined audio frequency range comprises about a 200-400 Hz. range.

19. A method to produce tactile feedback from sound, comprising:

enhancing, by a portable communication device, a portion of an electrical signal in a predetermined audio frequency range driving at least one loudspeaker with the enhanced electrical signal to produce an acoustic signal, wherein the produced acoustic signal includes a portion based on the electrical signal enhanced in the predetermined audio frequency range, wherein the portable communication device comprises the at least one loudspeaker and a transducer; and exciting the transducer with the acoustic signal to produce corresponding tactile feedback in the predetermined audio frequency range at the same time the acoustic signal is radiated directly to a region exterior to the portable communication device via at least one sound hole.

20. The method of claim 19, wherein the predetermined audio frequency range comprises about a 200-400 Hz. range.

21. A non-transitory computer-readable medium storing program instructions, execution of the program instructions by a data processor of a portable communication device resulting in operations comprising:

enhancing a portion of an electrical signal in a predetermined audio frequency range;

driving at least one loudspeaker with the enhanced electrical signal to produce an acoustic signal, wherein the produced acoustic signal includes a portion based on the electrical signal enhanced in the predetermined audio frequency range, wherein the portable communication device comprises the at least one loudspeaker and a transducer; and exciting the transducer with the audio signal to produce corresponding tactile feedback in the predetermined audio frequency range at the same time the acoustic signal is radiated directly to a region exterior to the portable communication device via at least one sound hole.

22. The computer-readable medium of claim 21, wherein the predetermined audio frequency range comprises about a 200-400 Hz. range.

23. A method to produce tactile feedback from sound, comprising:

providing, by a portable communication device, an electrical signal predetermined to comprise a portion with an enhanced amplitude in a predetermined audio frequency range;

driving at least one loudspeaker with the electrical signal to produce an acoustic signal, wherein the produced acoustic signal includes a portion based on the electrical signal enhanced in the predetermined audio frequency range, wherein the portable communication device comprises the at least one loudspeaker and a transducer; and exciting the transducer with the acoustic signal to produce corresponding tactile feedback in the predetermined audio frequency range at the same time the acoustic signal is radiated directly to a region exterior to the portable communication device via at least one sound hole.

24. The method of claim 23, wherein the predetermined audio frequency range comprises about a 200-400 Hz. range.

25. A non-transitory computer-readable medium storing program instructions, execution of the program instructions by a data processor of a portable communication device resulting in operations comprising:

providing an electrical signal predetermined to comprise a portion with an enhanced amplitude in a predetermined audio frequency range;

driving at least one loudspeaker with the electrical signal to produce an acoustic signal, wherein the produced acoustic signal includes a portion based on the electrical signal enhanced in the predetermined audio frequency range, wherein the portable communication device comprises the at least one loudspeaker and a transducer; and exciting the transducer with the acoustic signal to produce corresponding tactile feedback in the predetermined audio frequency range at the same time the acoustic signal is radiated directly to a region exterior to the portable communication device via at least one sound hole.

26. The computer-readable medium of claim 25, wherein the predetermined audio frequency range comprises about a 200-400 Hz. range.

27. The apparatus of claim 1, wherein the predetermined audio frequency range comprises about a 200-400 Hz. range.

28. The method of claim 17, wherein the predetermined audio frequency range comprises frequencies at or around 300 Hz.

* * * * *